Figure 1:
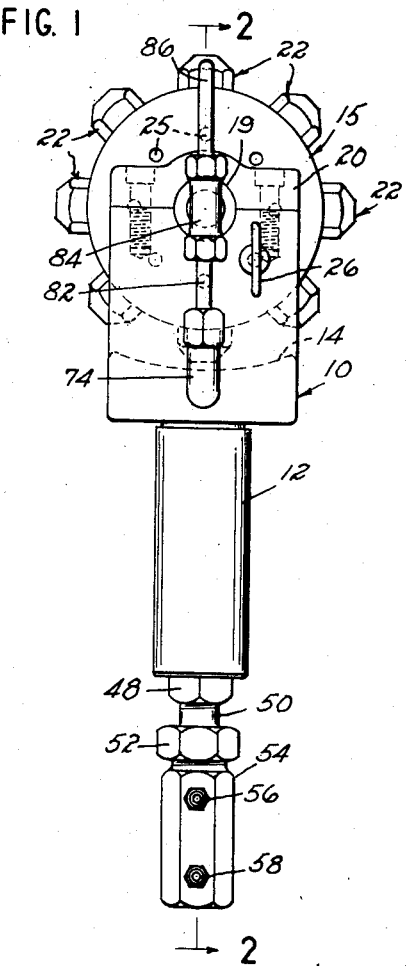

March 22, 1960

J. V. BERGFELDT 2,929,916

ELECTRODE WHEEL AND HOLDER ASSEMBLY FOR
RESISTANCE SPOT WELDING MACHINE

Filed Sept. 6, 1957

INVENTOR.
JULIUS V. BERGFELDT
BY
*Lindsey and Prutzman*
ATTORNEYS

United States Patent Office 2,929,916
Patented Mar. 22, 1960

2,929,916

ELECTRODE WHEEL AND HOLDER ASSEMBLY FOR RESISTANCE SPOT WELDING MACHINE

Julius V. Bergfeldt, New Britain, Conn.

Application September 6, 1957, Serial No. 682,363

2 Claims. (Cl. 219—120)

This invention relates to a novel and improved electrode wheel and holder assembly adapted for use with a resistance spot welding machine.

It is the object of this invention to provide a novel and improved electrode wheel and holder assembly for a resistance spot welding machine, the use of which will result in a material reduction in the down time of the machine required to replace worn electrodes or to replace electrodes of one configuration with electrodes of another configuration; which provides superior cooling of the electrodes and work; which is simple in construction and to use; and which is rugged so as to provide a long trouble-free service life.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 2:
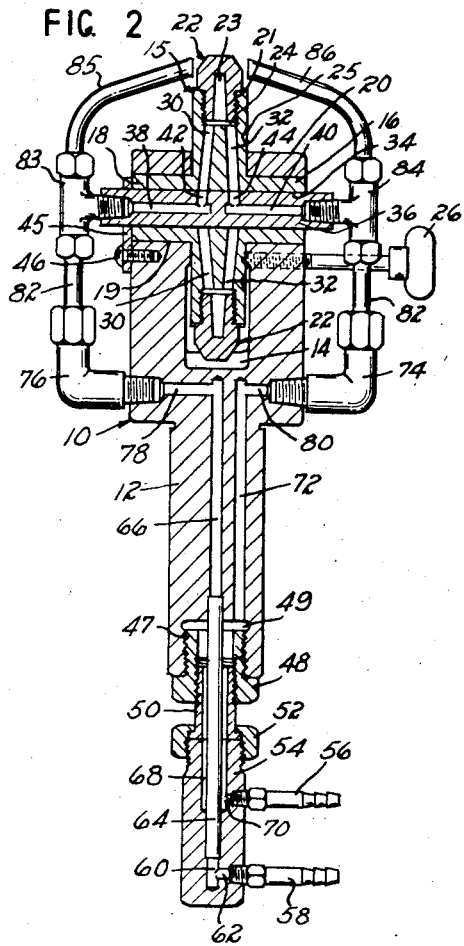

In the drawings:

Fig. 1 is a front elevational view of an electrode wheel and holder assembly constructed in accordance with the invention; and Fig. 2 is a cross sectional view substantially along the line 2—2 of Fig. 1.

With reference to the drawings, an electrode wheel and holder assembly constructed in accordance with the invention comprises a body 10, preferably of copper or copper alloy, having a shank 12 adapted to be mounted on a resistance spot welding machine in electrical connection with a power source. The body 10 is provided with a slot 14 in which is rotatably received an electrode wheel 15, also preferably of copper or copper alloy. The wheel 15 is provided at its hub with a pair of trunnions 16 and 18 rotatably received in a bearing recess 19 formed between the body and the cap 20 bolted to the body, as shown in Fig. 1. In the specific embodiment, the bearing surfaces, formed by the recess in which the wheel is journaled, are silver plated in order to assure good thermal and electrical conductivity between the body and wheel.

In accordance with the invention, a plurality of electrodes 22 are mounted in threaded recesses 21 formed in the periphery of the wheel 15 and extending generally radially thereof. As shown in the drawing, the electrodes are angularly spaced about the axis of the wheel so that by turning the wheel, a selected one of the electrodes may be brought into working position. In the embodiment shown, the electrode 22 extending vertically upwardly of the body is in work engaging position. To hold the wheel in selected rotated position, the wheel is provided with a plurality of circularly arranged recesses 25 in one face thereof and a lock screw 26 threadably mounted in the body is engageable with the recesses 25 and forms therewith a detent. Thus, the wheel may be locked in a plurality of rotated positions to locate a selected electrode in work engaging position.

As shown in Fig. 2, the inner end of each of the electrodes 22 is provided with an axial recess 23 in the bottom thereof extending a substantial distance inwardly of the electrode. Further, as shown in Fig. 2, the inner end of each of the electrodes 22 is spaced from the bottom of the recess 21 in which it is disposed to form a clearance or chamber 24 therebetween. The hub and trunnions 16, 18 of the wheel 15 are formed with an axial throughbore 34. Extending between each of the threaded recesses 21 and the throughbore 34 are a pair of generally radially extending internal passages 30, 32 communicating at their outer ends with the chambers 24 between the inner ends of the electrodes and bottoms of the recesses 21. Disposed within the bore 34 and extending axially of the wheel 15 is an elongated stationary cylindrical distributor 36 having aligned passages 38, 40 extending coaxially from its opposite ends and terminating, respectively, in ports 42, 44 adapted to communicate with the inner ends of the passages 30, 32 going to the uppermost electrode 22 which has been rotated to working position. A plate 45 fixed to the distributor 36 such as by welding secured to the body 10 by a screw 46 holds the distributor in stationary position so that the ports 42, 44 line up with the passages 30, 32 of the electrode in working position.

The shank 12 is provided with a threaded recess 47 in its lower end in which is threadably received a tubular pipe reducer 48 having its inner end spaced from the bottom of the recess to form a chamber 49. A tubular adaptor 50 is threadably engaged in the pipe reducer 48 and is connected by a coupling 52 to a hose fitting adaptor 54 having a pair of hose fittings 56, 58. The adaptor 54 is provided with an axial passageway 60 in communication with the fitting 58 by a branch passage 62. A tube 64 is engaged at its lower end in the passage 60 and extends coaxially in radially spaced relation through the adaptor 50, reducer 48 and is engaged at its upper end in an enlarged portion of a passage 66 extending axially of the shank 12. The passage 60 in the fitting adaptor 54 is enlarged at 68 to approximately the inner diameter of the tubular adaptor 50 and a branch passage 70 connects the enlarged portion 68 with the hose fitting 56. The shank is further provided with a passage 72 communicating at one end with the chamber 49 between the pipe reducer 48 and the bottom of the recess 47 and extending longitudinally of the shank in spaced relationship to passage 66.

A pair of elbow connectors 74, 76 are threadably mounted on opposite sides of the body 10. A passage 78 in the body connects the central passage 66 in the shank with one end of the elbow 76 and a passage 80 in the body connects one end of the elbow 74 with the passage 72 in the shank. Each of the elbows are connected at their other ends by pipes 82 to one end respectively of a pair of T-connectors 83, 84 threadably mounted on the opposite ends of the distributor 36 in registry with the passages 38 and 40 in the cylinder 36. A pair of fountain tubes 85, 86 are mounted on the other ends of the T-connectors and terminate closely adjacent the tip of the electrode 22 in working position in opposite sides of the electrode.

In the use of an electrode wheel and holder assembly constructed in accordance with the invention, the assembly is secured to either the lower or upper electrode arm of a resistance welding machine. To obtain the maximum advantage of the invention, it is preferred that such an assembly be secured to both the upper and lower electrode arms. The wheel 15 is adjusted relative to the body 10 to position the desired electrode 22 in working position and the screw 26 tightened to hold the wheel in proper position. A fluid coolant supply hose (not shown) is connected to the hose fitting 58 and a drain hose (not shown) is connected to the fitting 56. Coolant will thus be directed through the tube 64 and central passage 66 in the shank to the elbow 76 and thence to the tube 85 so as to impinge against the tip of the working electrode 22. Fluid will also be directed through the T-connector 83 into the distributor 36 for flow into and out of the chamber 23 in the working electrode and thence through the T-connector 84 to the tube 86 on the other side of the working electrode from the pipe 85. Excess fluid will drain through the pipe 82 associated with the elbow 74 and through the passage 72 into the chamber 49 in the shank for flow externally of the tube 64 to the drain fitting 56.

One of the advantages of an electrode wheel and holder assembly constructed in accordance with the invention is that any one of the electrodes carried by the wheel may be easily and very quickly brought into work engaging position without requiring a disassembly of the welding machine or wheel and holder assembly. The work engaging surfaces of the tips of the electrodes may be selected to be of the same area and contour, thus eliminating the need for stopping a production operation for an undesired length of time each time an electrode becomes worn and requires replacement. Further, if desired, the tips of the electrodes may be provided with work engaging surfaces of different area or contours or a combination of the two, thus permitting welding of flat or curved surfaces interchangeably without requiring the machine to be shut down and an electrode to be changed. As can be seen from the drawing, it is preferred that the body of the electrodes have a polygonal cross section to permit quick removal and replacement of the electrodes with a wrench. The provision of a plurality of electrodes on a single holder permits a test weld to be made with each electrode prior to a production run so that laboratory approval need not be obtained during the run because of a change in electrodes, thus resulting in a very material savings in unproductive down time on the machine. The use of an electrode wheel and holder assembly constructed in accordance with the invention obviously considerably reduces set-up time of the welding machine for a further savings in production time and expense. The electrode cooling provisions of the wheel and holder assembly assures adequate cooling of the working electrode and the electrode wheel as well as cooling of the work adjacent the working electrode. It can thus be seen that there has been provided a novel and extremely useful and versatile tool particularly adapted for use in production welding, the use of which results in an appreciable savings in production manpower and costs.

I claim:

1. An electrode wheel and holder assembly comprising a body of electrically conductive material, an electrode wheel of electrically conductive material rotatably supported on said body in electrical connection therewith, a plurality of spaced apart electrodes detachably mounted on said wheel, releasable means on said body engageable with the wheel to retain the same in a predetermined rotated position with a selected one of said electrodes in working position, each electrode being provided with a recess extending axially inwardly from the bottom thereof for the reception of fluid coolant, said wheel having a pair of internal radially extending fluid passages respectively associated with each electrode and communicating at one end with the recess in the respective electrode, and a distributor coaxially and rotatably received within said wheel and fixed to said body having a pair of fluid passages extending longitudinally thereof from its opposite ends and communicating respectively at their inner ends with the pair of fluid passages in the wheel associated with the electrode disposed in working position.

2. An electrode wheel and holder assembly comprising a body of electrically conductive material, an electrode wheel of electrically conductive material rotatably supported on said body in electrical connection therewith, a plurality of spaced apart radially extending electrodes threadably mounted on the periphery of said wheel, releasable means on said body engageable with the wheel to retain the same in a predetermined rotated position with a selected one of said electrodes in working position, the bottom of each electrode being provided with a recess extending axially inwardly thereof for the reception of fluid coolant, said wheel having a pair of internal radially extending fluid passages respectively associated with each electrode and communicating at one end with the recess in the respective electrode, a distributor coaxially and rotatably received within said wheel and fixed to said body, said distributor having a pair of fluid passages extending longitudinally thereof from its opposite ends and communicating respectively at their inner ends with the pair of fluid passages on the wheel associated with the electrode disposed in working position, a pair of fluid passages in said body, and a pair of tubes connected respectively at one end to said pair of passages in the body and terminating at their other ends closely adjacent the opposite sides of the electrode disposed in working position, said tubes being connected intermediate their ends to the outer ends respectively of the passages in said distributor.

References Cited in the file of this patent

UNITED STATES PATENTS

| | | |
|---|---|---|
| 1,097,883 | Schmarje | May 26, 1914 |
| 2,009,647 | Brusse et al. | July 30, 1935 |
| 2,130,657 | Watkin | Sept. 20, 1938 |
| 2,322,796 | Fentress | June 29, 1943 |
| 2,374,284 | Hall | Apr. 24, 1945 |
| 2,407,676 | Munson | Sept. 17, 1946 |
| 2,774,859 | Johnson | Dec. 18, 1956 |
| 2,794,900 | Width | June 4, 1957 |

FOREIGN PATENTS

| | | |
|---|---|---|
| 208,331 | Great Britain | Dec. 20, 1923 |